(12) United States Patent
Mathew et al.

(10) Patent No.: US 9,516,263 B2
(45) Date of Patent: Dec. 6, 2016

(54) AUTOMATIC CONFIGURATION OF THE LOGICAL ORIENTATION OF MULTIPLE MONITORS BASED ON CAPTURED IMAGES

(71) Applicant: Apple Inc., Cupertino, CA (US)

(72) Inventors: Binu K. Mathew, Los Gatos, CA (US); Nils E. Mattisson, Bjärred (SE)

(73) Assignee: Apple Inc., Cupertino, CA (US)

( * ) Notice: Subject to any disclaimer, the term of this patent is extended or adjusted under 35 U.S.C. 154(b) by 480 days.

(21) Appl. No.: 13/957,826

(22) Filed: Aug. 2, 2013

(65) Prior Publication Data

US 2015/0035998 A1 Feb. 5, 2015

(51) Int. Cl.
*H04N 5/232* (2006.01)
*H04N 7/14* (2006.01)
*H04N 5/225* (2006.01)

(52) U.S. Cl.
CPC ............ *H04N 7/141* (2013.01); *H04N 5/2258* (2013.01); *H04N 5/23254* (2013.01); *H04N 7/147* (2013.01)

(58) Field of Classification Search
CPC .... G06F 3/0481; G06F 3/012; G06F 3/04815; G06F 3/011; G06F 3/013; G06F 3/04886; G06F 1/3231; G06F 3/1454; G09G 2320/0261; G09G 2340/0492; G09G 2354/00; G09G 2356/00; G09G 2340/0464; H04N 21/44008; H04N 5/145; H04N 5/144; H04N 13/0484
IPC ............ G06F 3/0481, 3/012, 3/04815, 3/011, 3/013, 3/04886, 1/3231, 3/1454; G09G 2320/0261, 2340/0492, 2354/00, 2356/00, 2340/0464; H04N 21/44008, 5/145, 5/144, 13/0484
See application file for complete search history.

(56) References Cited

U.S. PATENT DOCUMENTS

| | | | |
|---|---|---|---|
| 7,555,142 B2 | 6/2009 | Hildreth et al. | |
| 7,952,609 B2 | 5/2011 | Simerly et al. | |
| 8,351,652 B2 | 1/2013 | Mathe | |
| 2012/0242893 A1* | 9/2012 | Akitomo | G06F 3/1446 348/441 |
| 2013/0093659 A1* | 4/2013 | Nomura | G06F 3/013 345/156 |
| 2013/0152013 A1* | 6/2013 | Forstall | G06F 3/0482 715/784 |
| 2014/0009395 A1* | 1/2014 | Ku | G06F 3/013 345/157 |
| 2014/0093169 A1* | 4/2014 | Kim | G06T 7/0081 382/173 |
| 2015/0128075 A1* | 5/2015 | Kempinski | G06F 3/012 715/765 |

(Continued)

*Primary Examiner* — Todd Buttram
(74) *Attorney, Agent, or Firm* — Blakely, Sokoloff, Taylor & Zafman LLP

(57) ABSTRACT

A system and method for configuring the display of a virtual workspace on multiple monitors connected to a single computing device based on images/frames captured by multiple cameras is described. A monitor orientation controller analyzes the frames to detect motion/movement within the captured scene and a corresponding centroid of the detected motion. The monitor orientation controller determines the positions of the monitors relative to each other based on the calculated centroids. Based on the relative determined positions of the monitors, the monitor orientation controller adjusts how the virtual workspace is displayed on the monitors. Other embodiments are also described.

13 Claims, 8 Drawing Sheets

(56) References Cited

U.S. PATENT DOCUMENTS

2015/0185855 A1\* 7/2015 Elak ...................... G06F 3/0487
345/156

\* cited by examiner

AUTOMATIC CONFIGURATION OF THE LOGICAL ORIENTATION OF MULTIPLE MONITORS BASED ON CAPTURED IMAGES

FIELD

A system and method for configuring the display of a virtual workspace on multiple monitors connected to a single computing device based on images/frames captured by multiple cameras. Other embodiments are also described.

BACKGROUND

Computing devices, such as desktop and laptop computers, allow the simultaneous use of multiple monitors. For example, a laptop computer may utilize a first monitor integrated into the body of the laptop and a second monitor communicatively coupled to and physically positioned to the right of the laptop. The multiple monitors may be configured such that a single virtual workspace spans two or more of the multiple monitors. For instance, in the example above, a virtual workspace generated by the laptop computer may span the first and second monitors such that the first monitor displays the left portion of the workspace and the second monitor displays the right portion of the workspace. In this example configuration, as a user moves a cursor from the left portion of the workspace to the right portion of the workspace, the cursor consequently moves from the first monitor to the second monitor.

Although the above configuration may be desirable when the second monitor is on the right side of the first monitor, when first and second monitors switch positions the above configuration would be confusing to the user. Instead, when the first and second monitors switch positions the first monitor should display the right portion of the workspace and the second monitor should display the left portion of the workspace. The process for altering the display configuration of multiple monitors coupled to a single computing device to correspond to their physical orientation involves the manual adjustment of display settings.

SUMMARY

A system and method for configuring the display of a virtual workspace on multiple monitors connected to a single computing device based on images/frames captured by multiple cameras is described. In one embodiment, the cameras are integrated or otherwise collocated with each respective monitor such that captured sets of frames represent a scene in front of each respective monitor from different perspectives. A monitor orientation controller analyzes the frames to detect motion/movement within the captured scene and a corresponding centroid of the detected motion. Since the sets of frames from each camera capture the scene from different perspectives, the centroid of motion will be at a different location with each set of frames.

In one embodiment, the monitor orientation controller determines the positions of the monitors relative to each other based on the calculated centroids. For example, when a centroid in a first set of frames corresponding to a first camera and a first monitor is located to the left of a centroid in a second set of frames corresponding to a second camera and a second monitor, the monitor orientation controller will determine that the first monitor is to the right of the second monitor.

Based on the relative determined positions of the monitors, the monitor orientation controller adjusts how the virtual workspace is displayed on the monitors. In the example configuration described above in which the first monitor is positioned to the right of the second monitor, the monitor orientation controller instructs the computing device to display a right portion of the virtual workspace on the first monitor and a left portion of the virtual workspace on the second monitor. In one embodiment, the monitor orientation controller adjusts how the virtual workspace is displayed on the monitors by altering or instructing an operating system to adjust system settings on the computing device.

By automatically adjusting the display of the virtual workspace based on detected motion captured by multiple cameras attached or otherwise collocated with the monitors, the virtual workspace is properly displayed across each monitor without reliance on manual configuration by a user. Although described above in relation to two monitors, in other embodiments more than two monitors may be coupled to the computing device. In these embodiments, the system and method described herein adjusts the display of the virtual workspace on these three or more monitors in a similar fashion as described in relation to two monitors.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
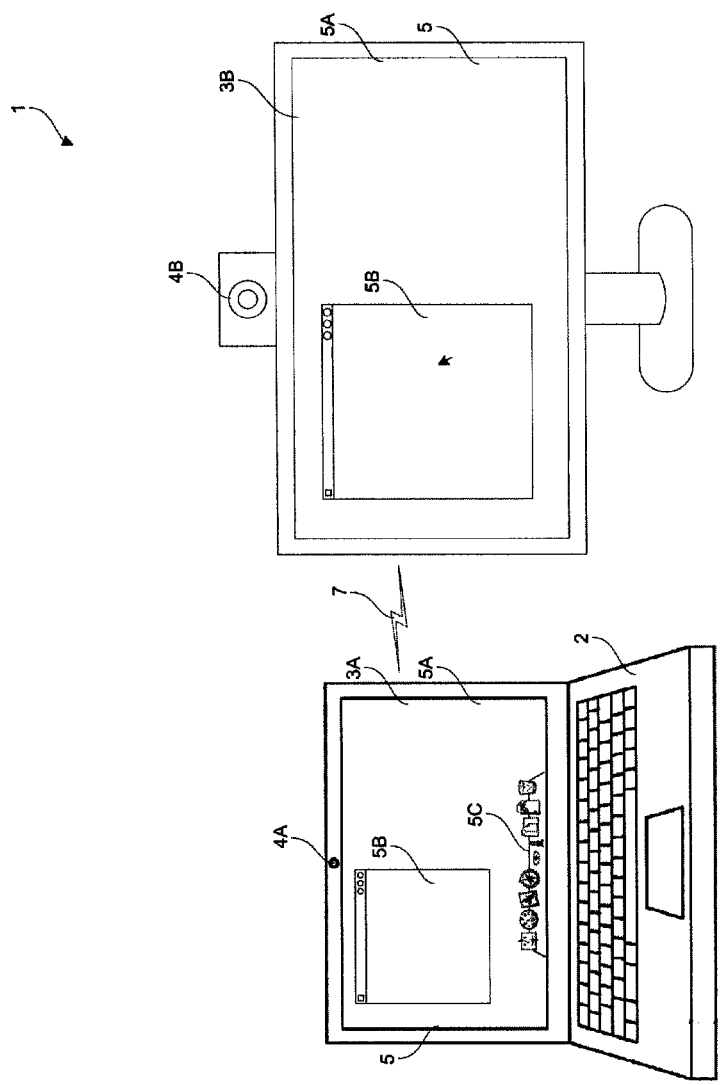
FIG. 1 shows a computing system, which includes a computing device, a primary monitor, a secondary monitor, and a set of cameras according to one embodiment of the invention.

FIG. 1 shows a computing system 1 according to one embodiment of the invention. The computing system 1 includes a computing device 2, a primary monitor 3A, a secondary monitor 3B, and cameras 4A and 4B. The primary and secondary monitors 3A and 3B are communicatively coupled to the computing device 2 such that a virtual workspace 5 generated by software and hardware systems of the computing device 2 may span across both monitors 3A and 3B based on images/frames captured by the cameras 4A and 4B.

As used herein, the virtual workspace 5 is a graphical user interface that displays one or more windows, icons, textual objects, and other display elements that represent applications and workflow items running on the computing device 2. For example, the virtual workspace 5 of FIG. 1 includes a desktop 5A, multiple application windows 5B, and an application dock 5C. As shown, the virtual workspace 5 is simultaneously displayed across the primary monitor 3A and the secondary monitor 3B such that the left portion of the virtual workspace 5 is shown on the primary monitor 3A and the right portion of the virtual workspace 5 is shown on the secondary monitor 3B. As a user moves a cursor across the workspace 5, the cursor may move between the primary and secondary monitors 3A and 3B. Although shown as the left portion of the virtual workspace 5 being displayed on the primary monitor 3A and the right portion of the virtual workspace 5 being displayed on the secondary monitor 3B, in other embodiments the primary monitor 3A may display the right portion of the workspace 5 and the secondary monitor 3B may display the left portion of the workspace 5. The virtual workspace 5 may change over time based on inputs from users and applications. For example, the application windows 5B may be moved, closed, or new application windows 5B may be opened. In one embodiment, hardware and software systems in the computing device 2 configure the arrangement of the virtual workspace 5 on the primary and secondary monitors 3A and 3B as will be described in greater detail below.

The computing device 2 may be any digital device capable of generating the virtual workspace 5 for display on the primary and secondary monitors 3A and 3B simultaneously. As shown in FIG. 1, the computing device 2 is a laptop computer with the primary monitor 3A integrated within the casing of the computing device 2. In other embodiments, the computing device 2 may be a desktop computer, a tablet computer, a mobile computer (e.g., a mobile telephone, a personal digital assistant, and a mobile media player), or any other similar device.

Figure 2A:
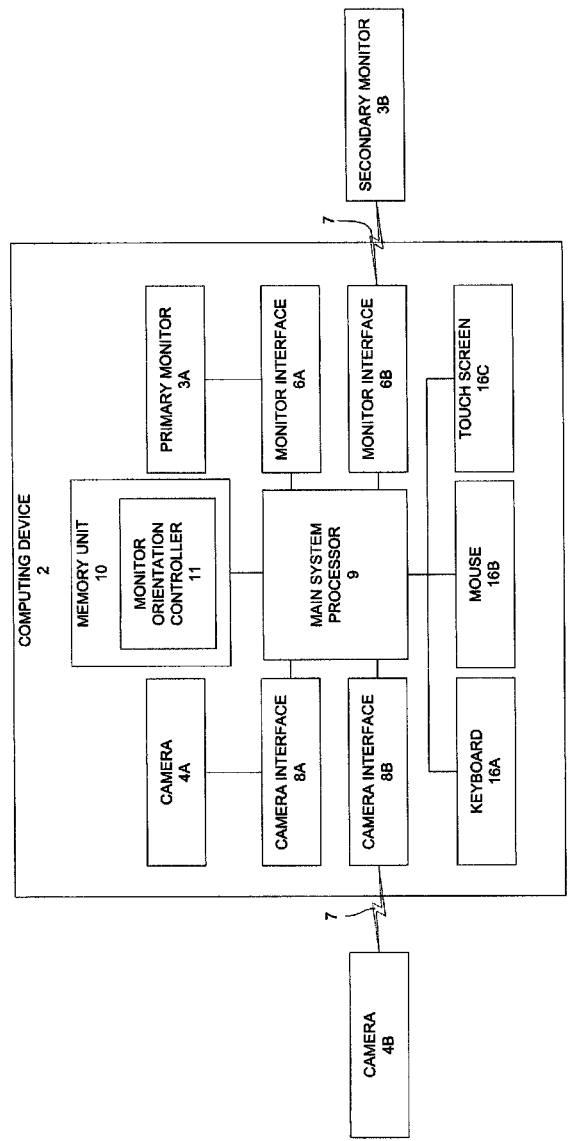
FIG. 2A shows a component diagram of the computing device according to one embodiment.

FIG. 2A shows a component diagram of the computing device 2 according to one embodiment. In other embodiments, the computing device 2 may include additional components not shown. Each element the computing device 2 shown in FIG. 2A will be described below by way of example below.

The computing device 2 may include one or more monitor interfaces 6 for communicating with the primary and secondary monitors 3A and 3B. In one embodiment, the monitor interfaces 6 transmit or facilitate the transmission of data (e.g., video and images) for updating information shown on the primary and secondary monitors 3A and 3B over a transmission medium. For example, a first monitor interface 6A may transmit data to the primary monitor 3A over a local system bus (e.g., an Accelerated Graphics Port bus, a Peripheral Component Interconnect bus, a Peripheral Component Interconnect-Express bus, and a Video Electronics Standards Association Local Bus) while a second monitor interface 6B may transmit data to the secondary monitor 3B over the link 7. The link 7 may be a wired connection (e.g., High-Definition Multimedia Interface (HDMI), Digital Visual Interface (DVI), DisplayPort, Mobile High-Definition Link (MHL), and Thunderbolt link) or a wireless connection (e.g., BLUETOOTH and WiFi). In one embodiment, the data transmitted for display on the monitors 3A and 3B includes data representing the virtual workspace 5.

In one embodiment, the monitor interfaces 6 may include specialized graphics processing circuitry. For example, the monitor interfaces 6 may include a graphics processing unit (GPU) to rapidly manipulate and alter memory to accelerate the creation of images in a frame buffer intended for output to the primary and/or secondary monitors 3A and 3B.

The primary and secondary monitors 3A and 3B are electronic visual displays for presenting one or more portions of the virtual workspace 5 to a user. The primary and secondary monitors 3A and 3B may use any display technology, including a liquid crystal display (LCD), an organic light-emitting diode (OLED) display, a cathode ray tube (CRT) display, or a plasma display panel (PDP) display. As shown in FIG. 1 and FIG. 2A, the primary monitor 3A may be contained within the casing of the computing device 2 while the secondary monitor 3B is external and connected to the computing device 2 through the link 7. In other embodiments, both the primary and second monitors 3A and 3B may be external and connected to the computing device 2 through one or more links 7.

As described above, the computing device 2 may be a desktop computer, a tablet computer, a mobile computer (e.g., a mobile telephone, a personal digital assistant, and a mobile media player), or any other similar device. In one embodiment, the computing device 2 is a tablet computer such that the primary monitor 3A is an integrated display within the tablet computer (i.e., the computing device 2). In this embodiment, the secondary monitor 3B may be a display within a separate tablet computer. For example, the primary and secondary monitors 3A and 3B may be displays integrated within IPAD tablet computers designed by Apple Inc. In this configuration, the primary and secondary monitors 3A and 3B may be placed side-by-side such that synchronized scrolling may be performed on a set of virtual windows displayed on the primary and secondary monitors 3A and 3B and running on separate tablet computers. In another embodiment, configuration of the primary and secondary monitors 3A and 3B as tablet computers in a side-by-side arrangement may allow for movement of files and data (e.g., uniform resource locators (URLs)) between applications and windows displayed on each monitor 3A and 3B and running on separate tablet computers. For example, files, images, and data may be dragged from a window or application displayed on primary monitor 3A into a separate window or application displayed on secondary monitor 3B. In another example, URLs may be copied and dragged between web browsers displayed in each of the primary and secondary monitors 3A and 3B and running on separate tablet computers.

Although described as including two monitors 3, in other embodiments the computing system 1 may include more than two monitors 3. For example, the computing system 1 may include three monitors 3, where a first monitor 3 shows the left portion of the virtual workspace 5, a second monitor 3 shows the center portion of the virtual workspace 5, and a third monitor 3 shows the right portion of the virtual workspace 5.

As noted above, the computing system 1 includes the cameras 4A and 4B for separately and independently capturing images/frames. The cameras 4A and 4B may be collocated or adjacent to the monitors 3A and 3B, respectively, such that captured frames represent a scene directly in front of the monitors 3A and 3B, respectively. For example, the cameras 4A and 4B may separately capture a user seated in front of the monitors 3A and 3B from different perspectives. In one embodiment, the computing device 2 includes one or more camera interfaces 8 for communicating with the cameras 4A and 4B. For example, the cameras 4A and 4B communicate/transmit frames of the captured scene to the camera interfaces 8A and 8B, respectively. The received frames may thereafter be processed to determine the physical positioning of the monitors 3A and 3B in relation to each other as will be described in further detail below.

The cameras 4A and 4B may include any type of sensor for selectively capturing two-dimensional or three-dimensional frames, including a charge-coupled device (CCD) or a complementary metal-oxide-semiconductor (CMOS). The cameras 4A and 4B or the camera interfaces 8A and 8B may include any set of digital or optical filters for de-noising, enhancing, or otherwise improving captured frames for processing. The cameras 4A and 4B may be connected to and/or integrated with their respective monitors 3A and 3B and/or the computing device 2. For example, as shown in FIG. 1 and FIG. 2A, the camera 4A is integrated into a casing of the monitor 3A and the computing device 2. In this embodiment, the camera 4A communicates with the camera interface 8A using a local bus of the computing device 2. As also shown in FIG. 1 and FIG. 2A, the camera 4B may be separate from the monitor 3B and/or the computing device 2. In this embodiment, the camera 4B is connected to the computing device 2 using the link 7. The link 7 may be a wired or wireless connection medium (e.g., Universal Serial Bus, FireWire, BLUETOOTH, and WiFi).

As described above, the primary monitor 3A may be a display in a tablet computer while the secondary monitor 3B is a display in a separate tablet computer. In this arrangement, the cameras 4A and 4B may be integrated on a front face of each of the tablet computers, respectively.

The computing device 2 may include a main system processor 9 and a memory unit 10. In one embodiment, the user-level functions of the device 2 are implemented under control of the processor 9 that has been programmed in accordance with instructions (code and data) stored in the memory unit 10. The processor 9 and the memory unit 10 are generically used here to refer to any suitable combination of programmable data processing components and data storage that conduct the operations needed to implement the various functions of the device 2. The processor 9 may be an application processor typically found in a laptop computer, desktop computer, or a smart phone, while the memory unit 10 may refer to microelectronic, non-volatile random access memory. An operating system may be stored in the memory unit 10, along with application programs specific to the various functions of the device 2. In one embodiment, a monitor orientation controller 11 may be stored in the memory unit 10. The monitor orientation controller 11 determines which portions of the virtual workspace 5 are displayed on each monitor 3A and 3B based on inputs from the cameras 4A and 4B.

Figure 2B:
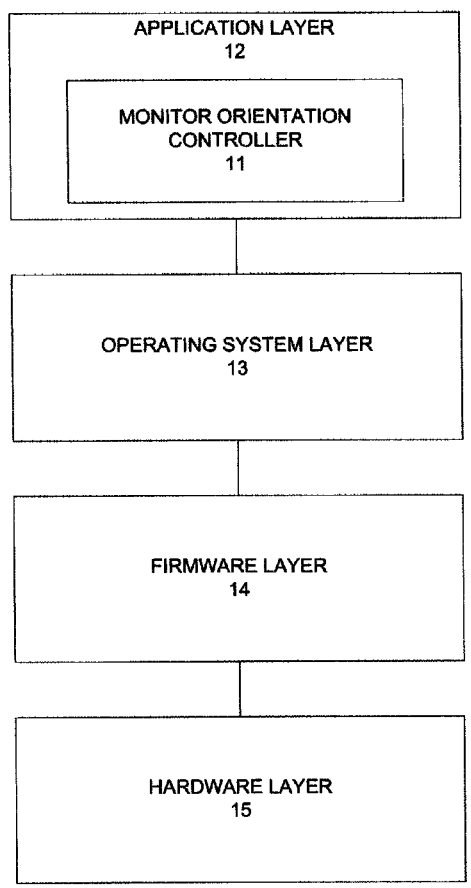
FIG. 2B shows a hierarchical view of the monitor orientation controller in relation to other hardware and software layers of the computing system.

FIG. 2B shows a hierarchical view of the monitor orientation controller 11 in relation to other hardware and software layers of the computing system 1. As shown, the monitor orientation controller 11 resides at the application layer 12 along with other applications operable on the computing device 2. In other embodiments, the monitor orientation controller 11 may reside at the operating system layer 13 along with components that manage system configuration and resource allocation within the computing device 2. The operating system layer 13 communicates with the firmware layer 14 to manage operations of integrated and peripheral hardware elements within or attached to the computing device 2. For example, the operating system layer 13 may send commands via the firmware layer 14 to the cameras 4A and 4B located at the hardware layer 15 to capture frames of a scene in front of the monitors 3A and 3B. The firmware layer 14 may assist in the control of other elements at the hardware layer 15, including optics and dedicated image filters.

Returning to FIG. 2A, the computing device 2 may also include additional input devices 16 for controlling operation of the computing device 2 by a user. For example, the input devices 16 may include a keyboard 16A, a mouse 16B, and a touch screen 16C. In other embodiments, the computing device may include other input mechanisms, including a network controller (e.g., an IEEE 802.11 or 802.3 controller) or a Bluetooth controller.

Figure 3:
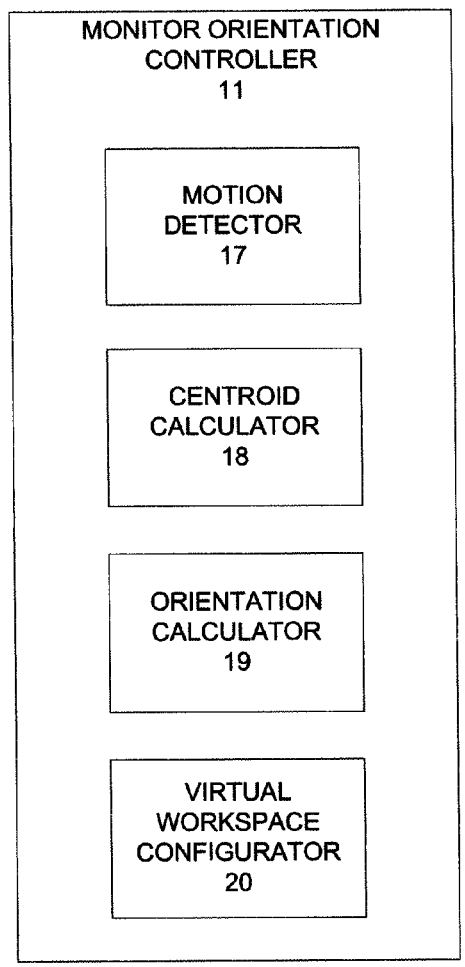
FIG. 3 shows a component diagram of the monitor orientation controller according to one embodiment.

FIG. 3 shows a component diagram of the monitor orientation controller 11 according to one embodiment. Each of the elements in the monitor orientation controller 11 may be implemented by one or more pieces of hardware and software integrated within the computing device 2 and/or distributed across one or more systems and components.

Figure 4A:
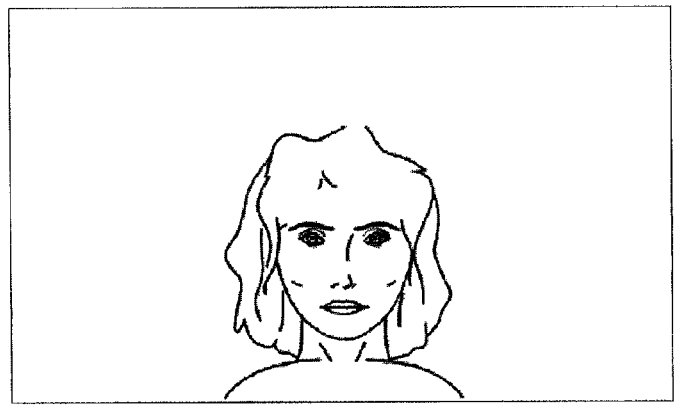
FIGS. 4A and 4B show a set of frames of a scene in front of the primary monitor captured by a camera integrated within the primary monitor.
Figure 4B:
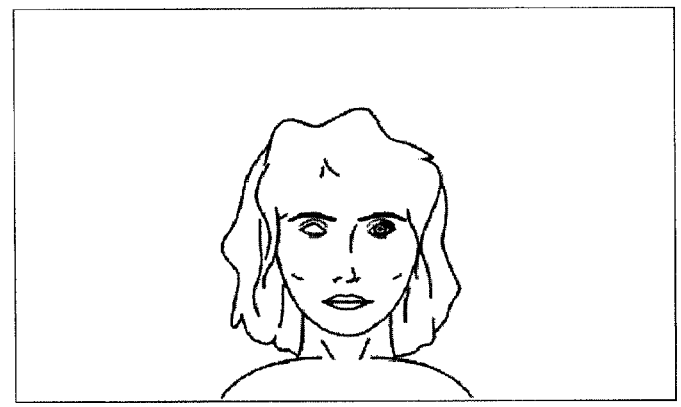

In one embodiment, the monitor orientation controller 11 includes a motion detector 17. The motion detector 17 receives a stream/set of frames from each of the cameras 4A and 4B and determines the presence of moving objects in each of the streams. For example, the camera 4A may successively capture the frames shown in FIGS. 4A and 4B. In this example, FIG. 4A shows a first frame of a user captured by the camera 4A when the user's eyes are open. FIG. 4B shows a second frame captured by the camera 4A after the first frame in which the user has blinked her right eye. In this example, the motion detector 17 detects the movement the user's right eyelid based on the first and second frames received from the camera 4A.

Figure 5A:
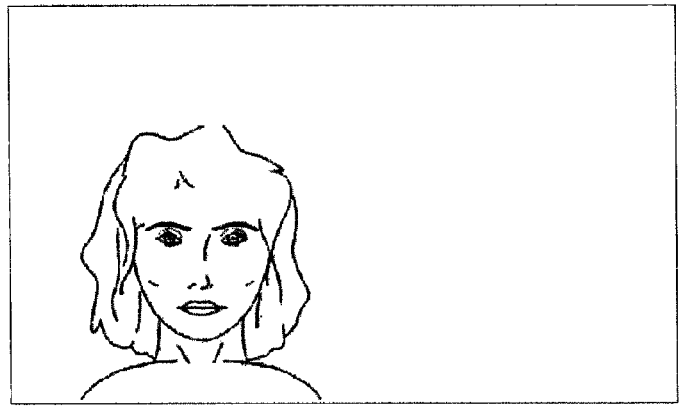
FIGS. 5A and 5B show a set of frames of a scene in front of the secondary monitor captured by a camera collocated with the secondary monitor.
Figure 5B:
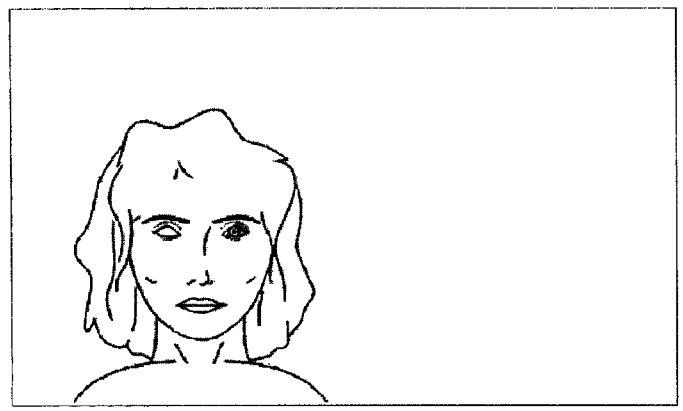

FIGS. 5A and 5B show the user as captured by the camera 4B. Since the camera 4B is located on or near the secondary monitor 3B, the perspective of the user blinking is different. Similar to the stream of frames from the camera 4A, the motion detector 17 detects the movement of the user's right eyelid based on the first and second frames received from the camera 4B.

Motion detection may be performed using any algorithm or technique. In one embodiment, the motion detector 17 compares successive frames in streams from each camera 4A and 4B to determine the number of altered pixels between each pair of frames. Upon determining a predefined number of pixels have been altered/changed between a pair of frames from a single camera 4 (e.g., 100 pixels), the motion detector 17 signals the discovery of motion in the stream of frames. In one embodiment, pre-processing may be performed on each frame to reduce the number of false positives as a result of natural differences in frames due to varied lighting, camera flicker, and CCD dark currents.

In one embodiment, the monitor orientation controller 11 includes a centroid calculator 18 for determining a centroid for the detected motion within each set of frames from the cameras 4A and 4B. The centroids represent the position of motion within the sets of frames. In one embodiment, the centroid may be defined by a set of Cartesian coordinates within a frame.

Figure 6A:
FIGS. 6A and 6B show centroids for motion detected in the sets of frames from each camera.
Figure 6B:

FIG. 6A shows a centroid $C_A$ calculated based on the detected motion in the first and second frames received from the camera 4A and shown in FIGS. 4A and 4B. FIG. 6B shows a centroid $C_B$ calculated based on the detected motion in the first and second frames received from the camera 4B and shown in FIGS. 5A and 5B. The centroids $C_A$ and $C_B$ in FIGS. 6A and 6B are located around the eyes of the user where the movement was detected (e.g., blinking of the eyes of the user). The centroids $C_A$ and $C_B$ are defined by Cartesian coordinates, which indicate the positioning of the motion relative to the borders of the captured frames.

In one embodiment, the monitor orientation controller 11 includes an orientation calculator 19. The orientation calculator determines the positions of the primary and secondary monitors 3A and 3B relative to each other based on centroids corresponding to the detected motion captured by each camera 4A and 4B. For example, the centroid $C_A$ of the detected motion in the set of frames captured by the camera 4A may be located at the coordinates (4, 5). In contrast, the centroid $C_B$ of the detected motion in the set of frames captured by the camera 4B may be located at the coordinates (6, 5). As shown in this example, the centroid $C_A$ is located to the right of the centroid $C_B$. Since the cameras 4A and 4B have been positioned to capture the view in front of the monitors 3A and 3B, respectively, the orientation calculator 19 can conclude that the primary monitor 3A is located to the left of the secondary monitor 3B.

Based on the relative determined positions of the monitors 3A and 3B determined by the orientation calculator 19, the virtual workspace configurator 20 adjusts how the virtual workspace 5 is displayed on the primary and secondary monitors 3A and 3B. In the example configuration described above in which the primary monitor 3A is positioned to the left of the secondary monitor 3B, the virtual workspace configurator 20 instructs the computing device 2 to display a left portion of the virtual workspace 5 on the primary monitor 3A and a right portion of the virtual workspace 5 on the secondary monitor 3B. In one embodiment, the virtual workspace configurator 20 adjusts how the virtual workspace 5 is displayed on the primary and secondary monitors 3A and 3B by altering or instructing the operating system to adjust system settings on the computing device 2.

By adjusting the display of the virtual workspace 5 based on detected motion captured by multiple cameras 4A and 4B attached or otherwise collocated with the monitors 3A and 3B, the monitor orientation controller 11 assists in properly displaying the virtual workspace 5 without reliance on manual configuration by a user. In one embodiment, the monitor orientation controller 11 operates continuously over time to ensure the virtual workspace 5 is being properly displayed on the primary and secondary monitors 3A and 3B based on their relative positions. Although described above in relation to two monitors 3A and 3B, in other embodiments more than two monitors 3 may be coupled to the computing device 2. In these embodiments, the monitor orientation controller 11 adjusts the display of the virtual workspace 5 on these three or more monitors 3 in a similar fashion as described above in relation to the monitors 3A and 3B.

Figure 7:
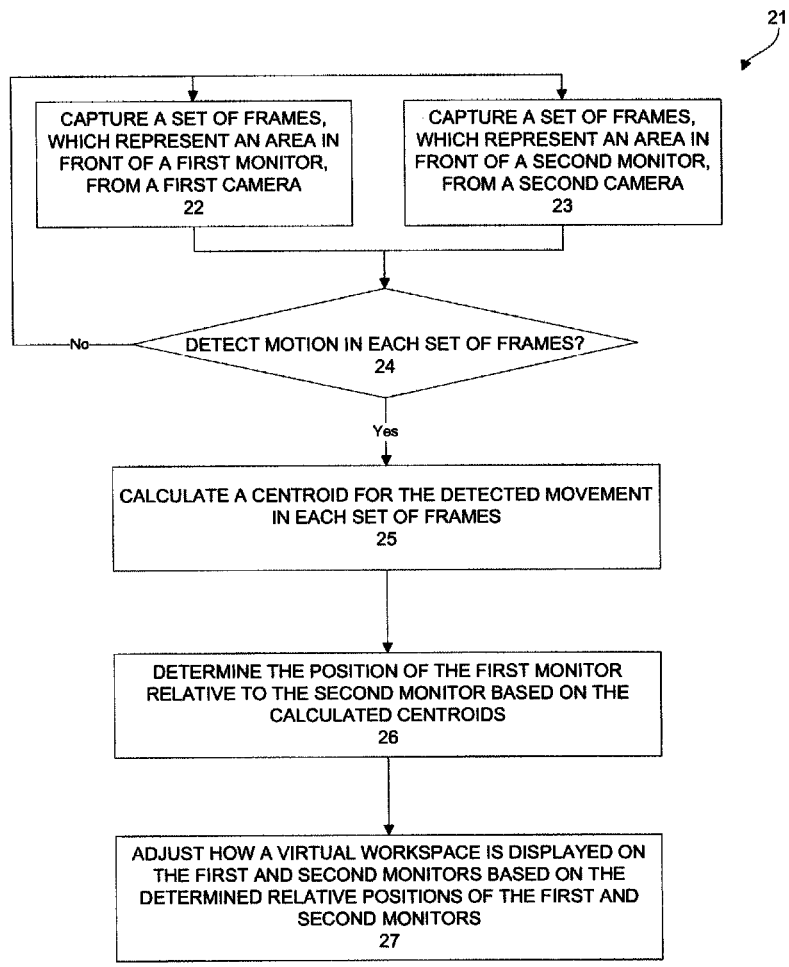
FIG. 7 shows a method for adjusting the display of the virtual workspace on the primary and second monitors according to one embodiment.

Turning now to FIG. 7, a method 21 for adjusting the display of the virtual workspace 5 on the primary and second monitors 3A and 3B according to one embodiment will be described. Each operation in the method 21 may be performed by one or more components of the computing device 2.

The method 21 begins at operations 22 and 23 with the capturing of separate sets of frames by the cameras 4A and 4B. The cameras 4A and 4B are collocated or are adjacent to the primary and secondary monitors 3A and 3B, respectively. Accordingly, the sets of frames captured by each camera 4A and 4B, represent a scene in front of the monitors 3A and 3B with different perspectives. The set of frames from the camera 4A are captured concurrently with the set of frames from the camera 4B such that both sets of frames capture the same scene at the same point in time.

Following the capture of the two sets of frames at operations 22 and 23, operation 24 attempts to detect motion in each set of frames. Motion detection may be performed using any algorithm or technique. In one embodiment, operation 24 compares successive frames from each camera 4A and 4B to determine the number of altered pixels between each pair of frames. Upon determining a predefined number of pixels have been altered/changed between a pair of frames from a single camera 4 (e.g., 100 pixels), operation 24 signals the discovery of motion in the set of frames.

Upon the detection of movement in both sets of frames from the cameras 4A and 4B, operation 25 calculates the centroid for each detected movement. The centroids represent the position of motion within the frames. In one embodiment, the centroids may be defined by a set of Cartesian coordinates within a frame as shown in FIGS. 6A and 6B. The centroids $C_A$ and $C_B$ in FIGS. 6A and 6B are located around the eyes of the user where the motion was detected (e.g., blinking of the right eye). The centroids $C_A$ and $C_B$ in this embodiment may be defined by Cartesian coordinates, which indicate the positioning of the movement relative to the borders of the captured frames. In other embodiments, different techniques may be used to uniquely identify the location of motion captured by each camera 4A and 4B.

Following the calculation of centroids for each set of frames in which movement/motion was detected; operation 26 determines the positions of the primary and secondary monitors 3A and 3B relative to each other. For example, when a first centroid in a first frame corresponding to the camera 4A and the monitor 3A is to the right of a second centroid in a second frame corresponding to the camera 4B and the monitor 3B, operation 26 determines that the monitor 3A is to the left of the monitor 3B. Similarly, when a first centroid in a first frame corresponding to the camera 4A and the monitor 3A is to the left of a second centroid in a second frame corresponding to the camera 4B and the monitor 3B, operation 26 determines that the monitor 3A is to the right of the monitor 3B.

After determining the relative positions of the primary and secondary monitors 3A and 3B, operation 27 adjusts how the virtual workspace 5 is displayed on the primary and secondary monitors 3A and 3B. For example, when the primary monitor 3A is determined at operation 26 to be to the left of the secondary monitor 3B, operation 27 instructs the computing device 2 to display a left portion of the virtual workspace 5 on the primary monitor 3A and a right portion of the virtual workspace 5 on the secondary monitor 3B. Similarly, when the primary monitor 3A is to the right of the secondary monitor 3B, operation 27 instructs the computing device 2 to display a right portion of the virtual workspace 5 on the primary monitor 3A and a left portion of the virtual workspace 5 on the secondary monitor 3B. In one embodiment, operation 27 adjusts how the virtual workspace 5 is displayed on the primary and secondary monitors 3A and 3B by altering or instructing the operating system to adjust system settings on the computing device 2.

By automatically adjusting the display of the virtual workspace 5 based on detected motion captured by multiple cameras 4A and 4B attached or otherwise collocated with the monitors 3A and 3B, the method 21 assists in properly displaying the virtual workspace 5 without reliance on manual configuration by a user. In one embodiment, the method 21 operates continuously over time to ensure the virtual workspace 5 is being properly displayed on the primary and secondary monitors 3A and 3B based on their relative positions. Although described above in relation to two monitors 3A and 3B, in other embodiments more than two monitors 3 may be coupled to the computing device 2. In these embodiments, the method 21 adjusts the display of the virtual workspace 5 on these three or more monitors 3 in a similar fashion as described above in relation to the monitors 3A and 3B.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for configuring the arrangement of a virtual workspace on a plurality of monitors, comprising:
    capturing, by a first camera, a first set of frames representing a scene in front of first and second monitors from the perspective of the first monitor;
    capturing, by a second camera, a second set of frames representing the scene in front of the first and second monitors from the perspective of the second monitor;
    detecting motion in each of the first and second sets of frames;
    calculating a first centroid for the detected motion in the first set of frames, wherein the first centroid represents the approximate center point of the detected motion relative to the first set of frames;
    calculating a second centroid for the detected motion in the second set of frames, wherein the second centroid represents the approximate center point of the detected motion relative to the second set of frames;
    determining the position of the first monitor in relation to the second monitor based on the first and second centroids; and
    adjusting the display of the virtual workspace on the first and second monitors based on determined position.

2. The method of claim 1, wherein when the first monitor is determined to be positioned to the left of the second monitor a left portion of the virtual workspace is displayed on the first monitor and a right portion of the virtual workspace is displayed on the second monitor.

3. The method of claim 1, wherein when the first monitor is determined to be positioned to the right of the second monitor a right portion of the virtual workspace is displayed on the first monitor and a left portion of the virtual workspace is displayed on the second monitor.

4. The method of claim 1, wherein the virtual workspace includes an application dock, one or more application windows, and a desktop.

5. The method of claim 1, wherein the first and second monitors are displays in separate tablet computers and the first and second cameras are integrated in each of the tablet computers, respectively.

6. A monitor orientation controller for configuring the arrangement of a virtual workspace on a first monitor and a second monitor coupled to a computing device, comprising:
    a motion detector to receive a first set of frames from a first camera and a second set of frames from a second camera and detect motion in each of the first and second sets of frames, wherein the first set of frames represent a scene in front of the first and second monitors from the perspective of the first monitor and the second set of frames represent the scene in front of the first and second monitors from the perspective of the second monitor;
    a centroid calculator to calculate (1) a first centroid for the detected motion in the first set of frames, wherein the first centroid represents the approximate center point of the detected motion relative to the first set of frames and (2) a second centroid for the detected motion in the second set of frames, wherein the second centroid represents the approximate center point of the detected motion relative to the second set of frames;
    an orientation calculator to determine the position of the first monitor in relation to the second monitor based on the first and second centroids; and
    a virtual workspace configurator to adjust the display of the virtual workspace on the first and second monitors based on the determined position.

7. The monitor orientation controller of claim 6, wherein when the first monitor is positioned to the left of the second monitor a left portion of the virtual workspace is displayed on the first monitor and a right portion of the virtual workspace is displayed on the second monitor.

8. The monitor orientation controller of claim 6, wherein when the first monitor is positioned to the right of the second monitor a right portion of the virtual workspace is displayed on the first monitor and a left portion of the virtual workspace is displayed on the second monitor.

9. The monitor orientation controller of claim 6, wherein the virtual workspace includes an application dock, one or more application windows, and a desktop.

10. An article of manufacture for configuring the arrangement of a virtual workspace on a plurality of monitors, comprising:
    a non-transitory machine-readable storage medium that stores instructions which, when executed by a processor in a computing device,
        capture, by a first camera, a first set of frames representing a scene in front of first and second monitors from the perspective of the first monitor;
        capture, by a second camera, a second set of frames representing the scene in front of the first and second monitors from the perspective of the second monitor;
        detect motion in each of the first and second sets of frames;
        calculate a first centroid for the detected motion in the first set of frames, wherein the first centroid represents the approximate center point of the detected motion relative to the first set of frames;

calculate a second centroid for the detected motion in the second set of frames, wherein the second centroid represents the approximate center point of the detected motion relative to the second set of frames;

determine the position of the first monitor in relation to the second monitor based on the first and second centroids; and adjust the display of the virtual workspace on the first and second monitors based on the determined position.

11. The article of manufacture of claim 10, wherein when the first monitor is determined to be positioned to the left of the second monitor a left portion of the virtual workspace is displayed on the first monitor and a right portion of the virtual workspace is displayed on the second monitor.

12. The article of manufacture of claim 10, wherein when the first monitor is determined to be positioned to the right of the second monitor a right portion of the virtual workspace is displayed on the first monitor and a left portion of the virtual workspace is displayed on the second monitor.

13. The article of manufacture of claim 10, wherein the virtual workspace includes an application dock, one or more application windows, and a desktop.

* * * * *